UNITED STATES PATENT OFFICE.

MAX FEHRINGER, OF WORCESTER, MASSACHUSETTS.

COMPOSITION OF MATTER TO BE USED FOR BRONZE-POWDER VARNISH.

1,157,768.   Specification of Letters Patent.   Patented Oct. 26, 1915.

No Drawing.   Application filed November 2, 1914.   Serial No. 869,917.

*To all whom it may concern:*

Be it known that I, MAX FEHRINGER, a citizen of the German Empire, residing at Worcester, in the county of Worcester and State of Massachusetts, have invented a new and useful Composition of Matter to be Used for Bronze-Powder Varnish, of which the following is a specification.

Bronze varnishes of good quality must have no ingredients, which change the brightness of the highly fine and sensitive bronze powder to a dull varnish.

Processes, as hitherto known, of manufacturing bronze varnishes from natural resins are difficult and necessitate several operations on account of more or less sourness of said resins.

According to the present invention, my process consists in dissolving artificial cumaron resin in benzin, gasolene or benzol or in mixtures of these solvents. I may also use chlorethylene as a solvent, either alone or mixed with one or more of the solvents mentioned above.

The bronze powder which is a part of this varnish does not ever change its luster, and the dry bronze painting holds its full original metallic brightness.

I claim:

1. A bronze powder varnish containing cumaron resin dissolved in a solvent comprising benzin.

2. A bronze powder varnish containing cumaron resin dissolved in a solvent comprising benzin and gasolene.

3. A bronze powder varnish containing cumaron resin dissolved in a solvent comprising benzin, gasolene and benzol.

4. A bronze powder varnish containing cumaron resin dissolved in a solvent comprising benzin, gasolene, benzol and chlorethylene.

MAX FEHRINGER.

Witnesses:
 JOHN L. MURPHY,
 WILLIAM CHRISTIE.